Jan. 6, 1953          S. A. WEHN          2,624,145
SOUND PRODUCER FOR FISHING APPARATUS
Filed July 18, 1949          4 Sheets-Sheet 1
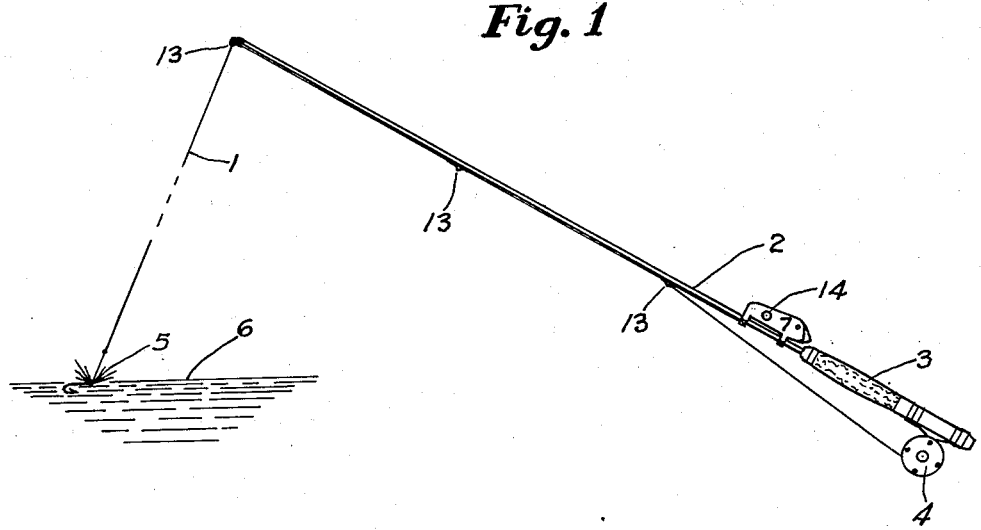
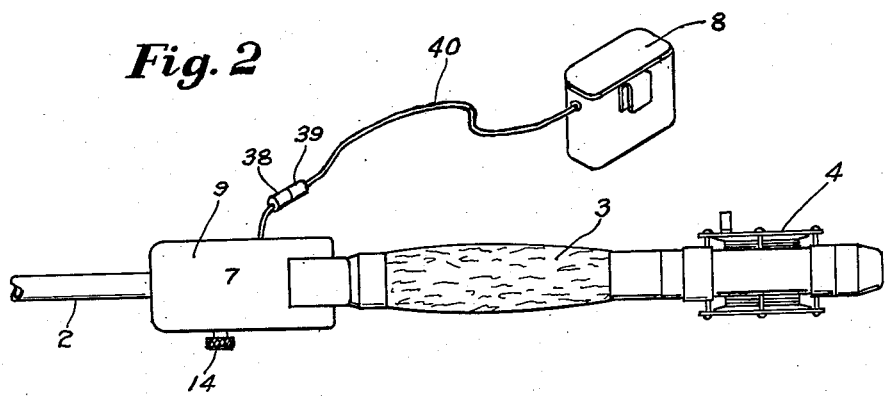
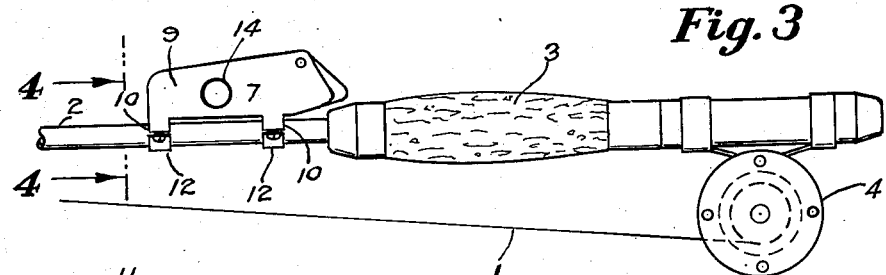
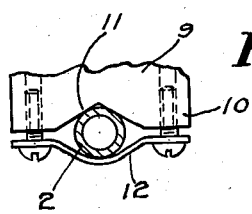
INVENTOR.
STANLEY A. WEHN
BY John Flam
ATTORNEYS.

Jan. 6, 1953 S. A. WEHN 2,624,145
SOUND PRODUCER FOR FISHING APPARATUS
Filed July 18, 1949 4 Sheets-Sheet 2
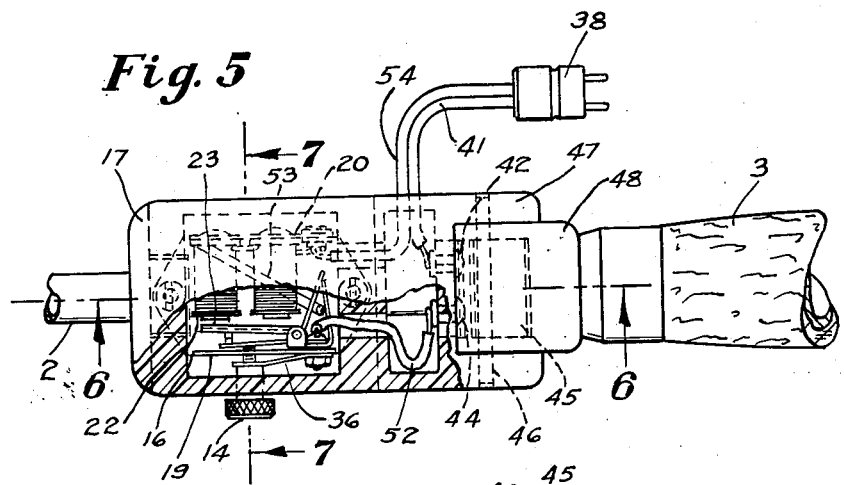
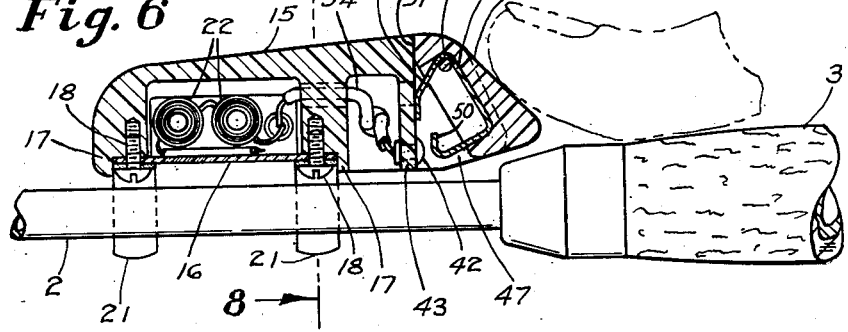
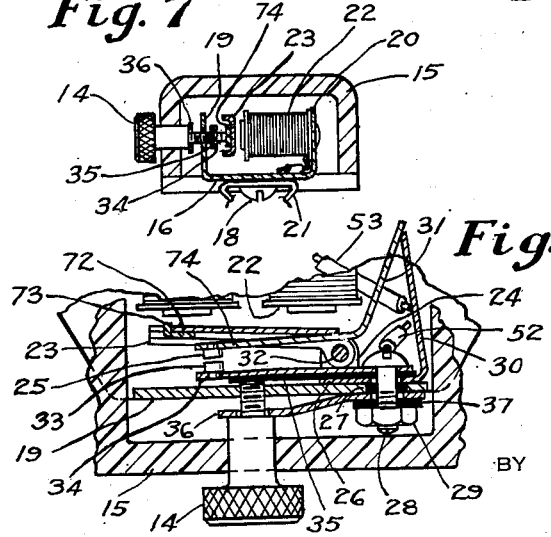
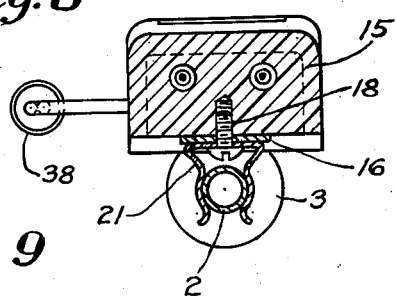
INVENTOR.
STANLEY A. WEHN
BY John Flam
ATTORNEYS.

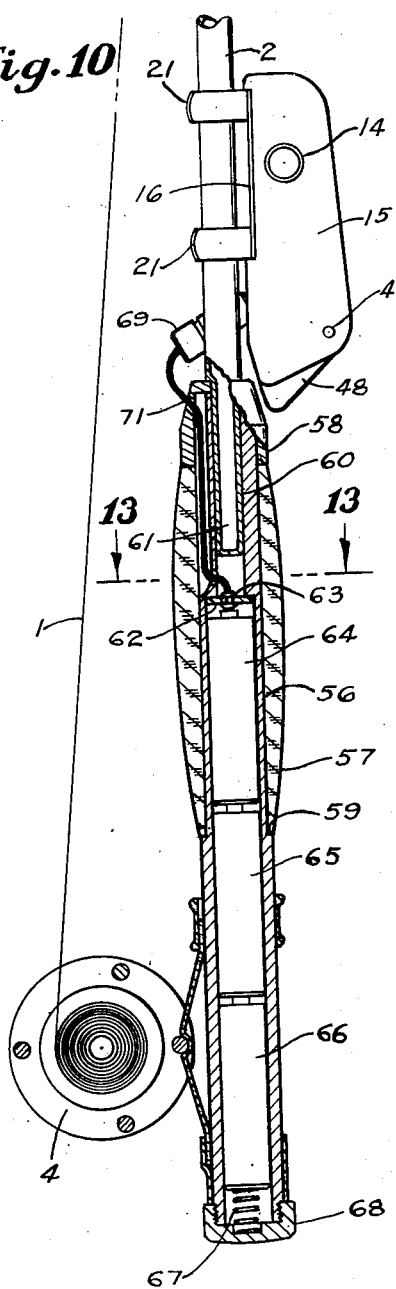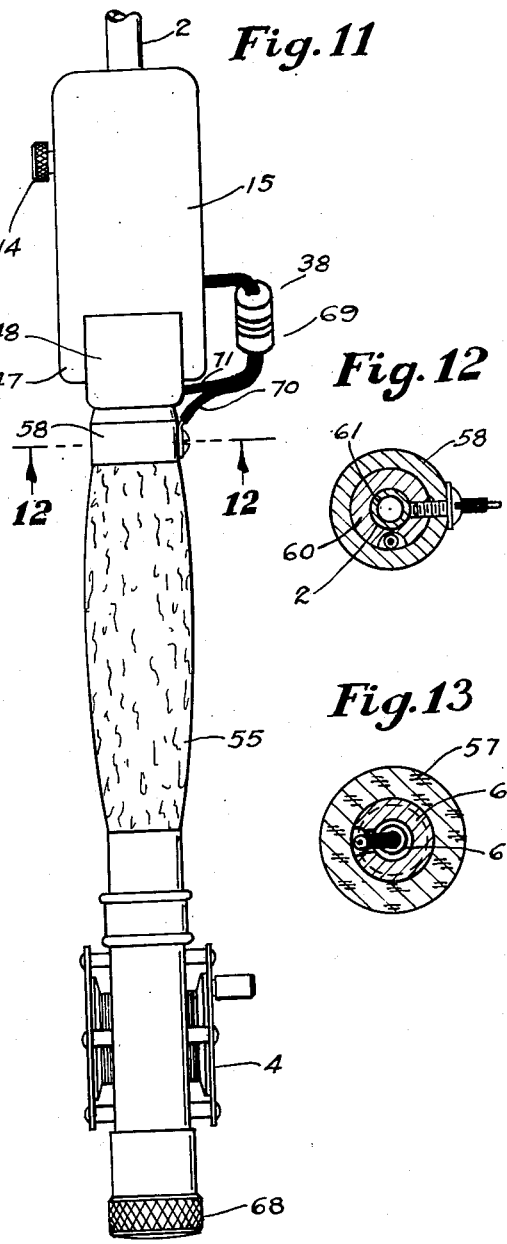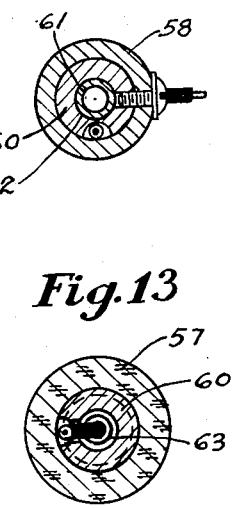

Jan. 6, 1953 S. A. WEHN 2,624,145
SOUND PRODUCER FOR FISHING APPARATUS
Filed July 18, 1949 4 Sheets-Sheet 4
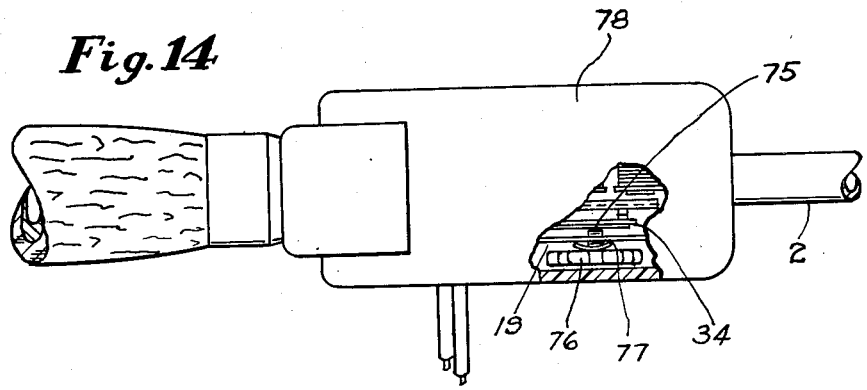
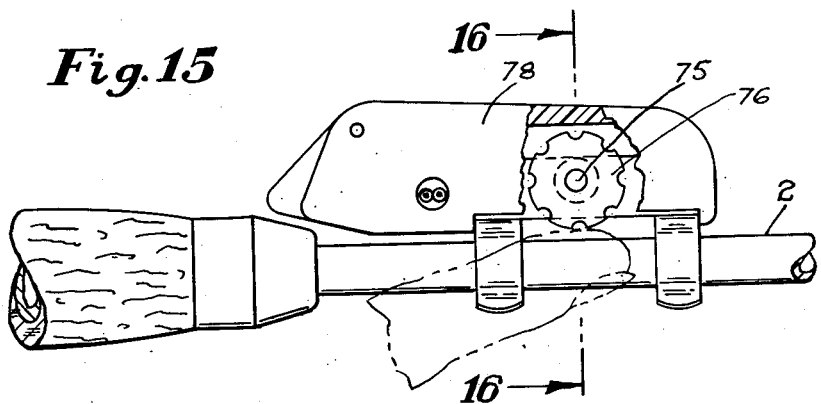
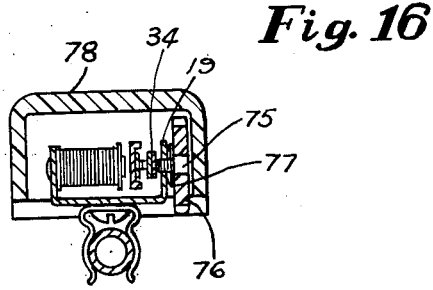
INVENTOR.
STANLEY A. WEHN
BY John Flam
ATTORNEYS.

Patented Jan. 6, 1953

2,624,145

UNITED STATES PATENT OFFICE 2,624,145

SOUND PRODUCER FOR FISHING APPARATUS

Stanley A. Wehn, Santa Monica, Calif.

Application July 18, 1949, Serial No. 105,322

2 Claims. (Cl. 43—17.1)

This invention relates to the art of fishing, and especially to fishing by the aid of lures or baits.

When fishing for example with artificial flies, the fly fisherman endeavors to attract the fish by visual means. Such methods of fishing may produce satisfactory results; however, it is an object of this invention to make it possible more effectively to lure fish into striking.

It is now well established that fish are capable of perceiving sound. It is another object of this invention to take advantage of this ability, and especially by producing sound at the bait for supplementing the sensory perceptions of the fish.

The enticement of fish to strike at bait may be further improved by simulating the sound of various insects that are palatable to the fish. It is accordingly another object of this invention to make it possible to adjust the tone quality of the sound vibrations for these purposes.

In order to attain these objects, vibrations are generated which are transmitted to the bait from the place where the fisherman is located. Thus, for example, a mechanical vibrator (operated for example by electromagnetism) may be coupled near the butt of a fishing rod. The frequency of vibration may be adjusted readily by the fisherman. The vibrations therefore may be made to simulate the drone or hum of the larger insects, or the singing quality of flies or mosquitoes. The vibrations are transmitted effectively through the rod and the line to the bait.

It is therefore another object of this invention to provide a simple and effective mechanism for producting these desirable results.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is an elevational view of a fishing rod equipped with a vibrator;

Fig. 2 is a plan view of the butt portion of the fishing rod;

Fig. 3 is a side elevation thereof;

Fig. 4 is a diagrammatic section, taken along a plane corresponding to line 4—4 of Fig. 3;

Fig. 5 is an enlarged view, partly in section, similar to Fig. 2;

Fig. 6 is a sectional view, taken along a plane corresponding to line 6—6 of Fig. 5;

Fig. 7 is a sectional view, taken along a plane corresponding to line 7—7 of Fig. 5;

Fig. 8 is a sectional view, taken along a plane corresponding to line 8—8 of Fig. 6;

Fig. 9 is an enlarged sectional view of a portion of the vibrator;

Fig. 10 is a view, partly in section, of the butt end of a modified form of the invention;

Fig. 11 is an elevation thereof;

Fig. 12 is an enlarged sectional view, taken along a plane corresponding to line 12—12 of Fig. 11;

Fig. 13 is an enlarged sectional view, taken along a plane corresponding to line 13—13 of Fig. 10;

Fig. 14 is a fragmentary plan view, partly broken away, of another modification;

Fig. 15 is a side elevation, partly broken away, of the modification shown in Fig. 14; and Fig. 16 is a sectional view, taken along a plane corresponding to line 16—16 of Fig. 15.

In Fig. 1 a line 1 is indicated, shown as appropriately supported by a fishing rod 2, as by the aid of guides 13. This fishing rod is provided at its butt end with a handle 3 and a reel 4 for control of the line 1.

The end of the line 1 is shown as carrying a leader with an artificial fly 5 disposed near the surface of the body of water 6, such as a stream or lake.

A vibrator mechanism 7 (Figs. 1, 2 and 3) is clamped to the rod 2 which, in this instance, is shown as formed of hollow tubing (see Figs. 4 and 8). The vibrator mechanism 7 is electromagnetically operated, and energized by the aid of dry cell battery 8 indicated as enclosed in a container (Fig. 2) which may appropriately be clamped to the belt, or otherwise supported on the person.

In the form shown in Figs. 1 to 4, the casing 9 of the vibrator is hollow, having the end walls 10. Each of these walls 10 is provided with a shallow V-shaped recess 11 (Fig. 4) into which the rod 2 is accommodated. A strap 12 cooperates with each of the projections 10 for clamping the vibrator casing 9 to the rod 2.

By virtue of the vibrations generated by the vibrator 7, the strap 12 and the rod 2 are correspondingly vibrated. The line 1, being in contact with the rod 2 by way of the eyelets or line guides 13 (Fig. 1), is subjected to these vibrations. The vibrations are finally transmitted to the bait 5, where a tone is produced due to these vibrations. The frequency of the vibrations is made adjustable, as by the aid of a thumb screw 14 projecting from the side of the vibrator 7. Accordingly, the singing or droning tone of an insect can be quite well simulated by the audible vibrations produced in the line 1 of the bait 5.

In the form of the vibrator shown in Figs. 5 to 11, inclusive, the vibrator casing 15 is shown as made from a plastic, or other insulation material. It has an open bottom, to which is attached a plate or support 16 made from magnetic material. As shown most clearly in Figs. 5, 6 and 8, this support has end projections 17 for the accommodation of the attaching screws 18 which hold the support 16 in place over the recess in the casing 15. The support 16 is bent to form the spaced arms 19 and 20. These arms form a support for the operating parts of the electromagnetically energized vibrator mechanism.

Spring clamps 21 are attached to the support 16, as by the same screws 18 which fasten the support 16 to the lower portion of the casing 15. These spring clamps, as shown most clearly in Fig. 8, are readily attachable and detachable from the rod 2.

In the present instance, the vibrator mechanism includes a pair of coils 22 mounted upon the arm 20 and projecting toward the operating arm 19. These coils may be provided with appropriate cores, and are arranged to influence an armature 23. This armature 23 is attached to the upper surface of a support 31 made from conducting material, as by the aid of an upturned flange 73 formed at the front edge of the extension 72 of support 31. This support 31 is pivoted by pin 32 to an ear 24. Extension 72 has a depressed tongue portion 74 that carries the movable contact 25. This tongue may be formed by shearing the extension 72. The ear 24 is formed integrally with a member 26 that is mounted on the arm 19, shown most clearly in Fig. 9. For this purpose, it is provided with an appropriate aperture aligned with an insulation bushing 27 through which a conducting screw 28 passes. The screw 28 is provided with a nut 29 for holding the member 26 securely in place, as well as for supporting other elements to be hereinafter described. The member 26 has an upwardly extending spring arm 30 that is in electrical contact with the arm 31 projecting from the armature 23.

A cooperating contact 33 is mounted on a spring arm 34 which is insulatingly supported on arm 19 by the aid of the screw 29. Thus, between the spring arm 34 and the member 26, an insulation strip 35 is provided. The head of screw 28 is in electrical contact with the spring arm 34, and forms one element in the electrical circuit for controlling the vibrator.

Adjustment of the contact 33 with respect to the contact 25 is effected by the aid of the screw 14. This screw 14 threads into the arm 19, and has a cylindrical portion which is freely rotatable in the wall of the casing 15. A leaf spring 36 has its free end in engagement with the cylindrical portion of the screw 14, and is anchored between the arm 19 and the insulation washer 37 of the screw 28. This screw is insulated from arm 26 by the provision of a large clearance hole in the arm. This leaf spring 36 serves to restrain the screw 14 from inadvertent adjustment.

When the vibrator is in the de-energized position shown in the drawings, the armature 23 is urged to the dropped position by the spring arm 30. However, as soon as this occurs, a circuit is established through contacts 25 and 33 for energizing the coils 22. The armature 23 is attracted, opening the circuit at the contacts 25 and 33, and the armature again drops to the position shown. The rate of this vibration is controllable by adjustment of the screw 14.

The electrical connections for the vibrator may be provided by the aid of a two-pronged plug 38 which is adapted to be connected to a socket 39 (Fig. 2), connected as by flexible lead 40 to the battery 8. One conductor 41 leads to a contact button 42 which has a rounded contacting end projecting through the end wall 43 of the casing 15 (Fig. 6). A similar contact button 44 is provided, and both contact buttons may be bridged by a conducting spring 45.

This conducting spring is mounted upon a transverse pin 46 that extends between the end flanges 47 formed on the casing 15. The pin 46 also passes through a finger piece 48 made of insulation material and located between flanges 47. The inner side of this finger piece 48 is recessed to accommodate one portion of the conducting spring 45. The upper end portion 49 is in contact with the external end wall 43 of the casing 15 in order to urge the finger piece 48 to the open position illustrated in Fig. 6. However, when the finger is used to depress finger piece 48, the inner, upwardly turned end 50 of the spring 45 is urged into contact with both the buttons 42 and 44, thereby completing the energizing circuit. The portion 49 of the spring 45 normally maintains the contacting projection 50 out of operating position. In this position, the flat wall 51 of the finger piece 48 is urged into contact with the wall 43, thereby limiting movement of the finger piece 48.

Button 44 is connected, as by a conductor 52, to the screw 28 and thence to the lower contact 33. When contact 25 is in engagement with contact 33, the circuit is completed through this contact, member 74, arm 31, spring 30, lead 53, coils 22, and lead 54 to the plug 38. Appropriate apertures are formed in the walls of the casing 15, as well as in the arm 20, to permit the passage of these conductors, which are appropriately covered with insulation.

In the form of the invention shown in Figs. 10, 11, 12, and 13, the battery casing 8 is obviated. Instead, the handle 55 is so formed as to accommodate the dry cells. For this purpose, there is a metal sleeve 56, over which is disposed the cork grip 57. This cork grip 57 is held in place by a ferrule 58 urging the lower end of the grip 57 against the shoulder 59 formed on the sleeve 56. The sleeve 56 has, at its upper end, a socket member 60 into which the butt end 61 of the rod 2 is frictionally engaged. Between the socket 60 and the lower portion of the sleeve 56 there is provided an insulation washer 62 through which a contact button 63 passes. This contact button makes electrical engagement with the center terminal of the uppermost cell 64. Three cells 64, 65, and 66 are arranged in regular order to form a series arrangement. The lowermost cell 66 is engaged by a spring 67 held in place by the threaded cap 68.

Connections to the terminals of the battery are provided by the socket 69 coupled to plug 38. One conductor 70, leading from the socket 69, is in contact with the ferrule 58, and thence, by way of socket 60, sleeve 56, and cap 68, with the lower end of the cell 66. The upper end of the battery arrangement is connected to a conductor 71 which is attached to the button 63.

In the form of the invention illustrated in Figs. 14, 15, and 16, the manner in which the pitch or frequency of vibrations may be adjusted is somewhat different from the mechanism shown in the previous figures. Thus, the movable contact arm 34 is engaged by a screw 75 carrying a finger wheel or head 76, which head is made from insulation. This screw 75 threads through the arm 19. A spring washer 77 is interposed between the arm 19 and the head 76. This may be a V-type washer restraining inadvertent adjustment of the screw.

The casing 78 of the vibrator is so arranged that the wheel or head 76 projects substantially to the bottom of the casing, as shown most clearly in Fig. 16. Furthermore, the head 76 is located in this instance within the casing 78. Digital control of the wheel or head 76 is readily effected, as indicated in Fig. 15, while the user is grasping the grip or butt end of the rod.

The inventor claims:

1. A fishing device comprising a rod, a vibrating reed sound producing device on the rod, an electric circuit for operating the reed of the device, a line and hook connected to the rod, means connected to the sound producing device for transmitting continuous sound vibrations to the line and hook prior to the strike of a fish on the hook to attract the fish to the hook, and a hand grip on the rod, said sound producing device including a circuit closing member for the circuit and overlapping the hand grip and in such relation thereto that the hand of the operator, while gripping the hand grip, can maintain one finger thereof in engagement with the circuit closing member to operate said sound producing device.

2. A fishing device comprising a rod, a vibrating reed sound producing device on the rod, an electric circuit for operating the reed of the device, a line and hook connected to the rod, means connected to the sound producing device for transmitting continuous sound vibrations to the line and hook prior to the strike of a fish on the hook to attract fish to the hook, and a hand grip on the rod, said sound producing device including a circuit closing member for the circuit, and so arranged on the rod as to be readily available for finger manipulation by the hand that grips the handle for operating, at will, said sound producing device.

STANLEY A. WEHN.

REFERENCES CITED

The following references are of record in the file of this patent:

UNITED STATES PATENTS

| Number | Name | Date |
|---|---|---|
| 902,447 | Piper | Oct. 27, 1908 |
| 1,062,488 | McCluer et al. | May 20, 1913 |
| 1,918,458 | Dremel | July 18, 1933 |
| 2,186,114 | Lindberg | Jan. 9, 1940 |